(No Model.) 5 Sheets—Sheet 1.
H. S. TOWNSEND & G. A. SCHNEEBELI.
STOPPING MECHANISM FOR KNITTING MACHINES.

No. 436,010. Patented Sept. 9, 1890.

Witnesses:
James H. Bell
Henry N. Paul Jr.

Inventor
Harry S. Townsend and
Gustav A. Schneebeli
By Halliwell & Plale
Attorneys

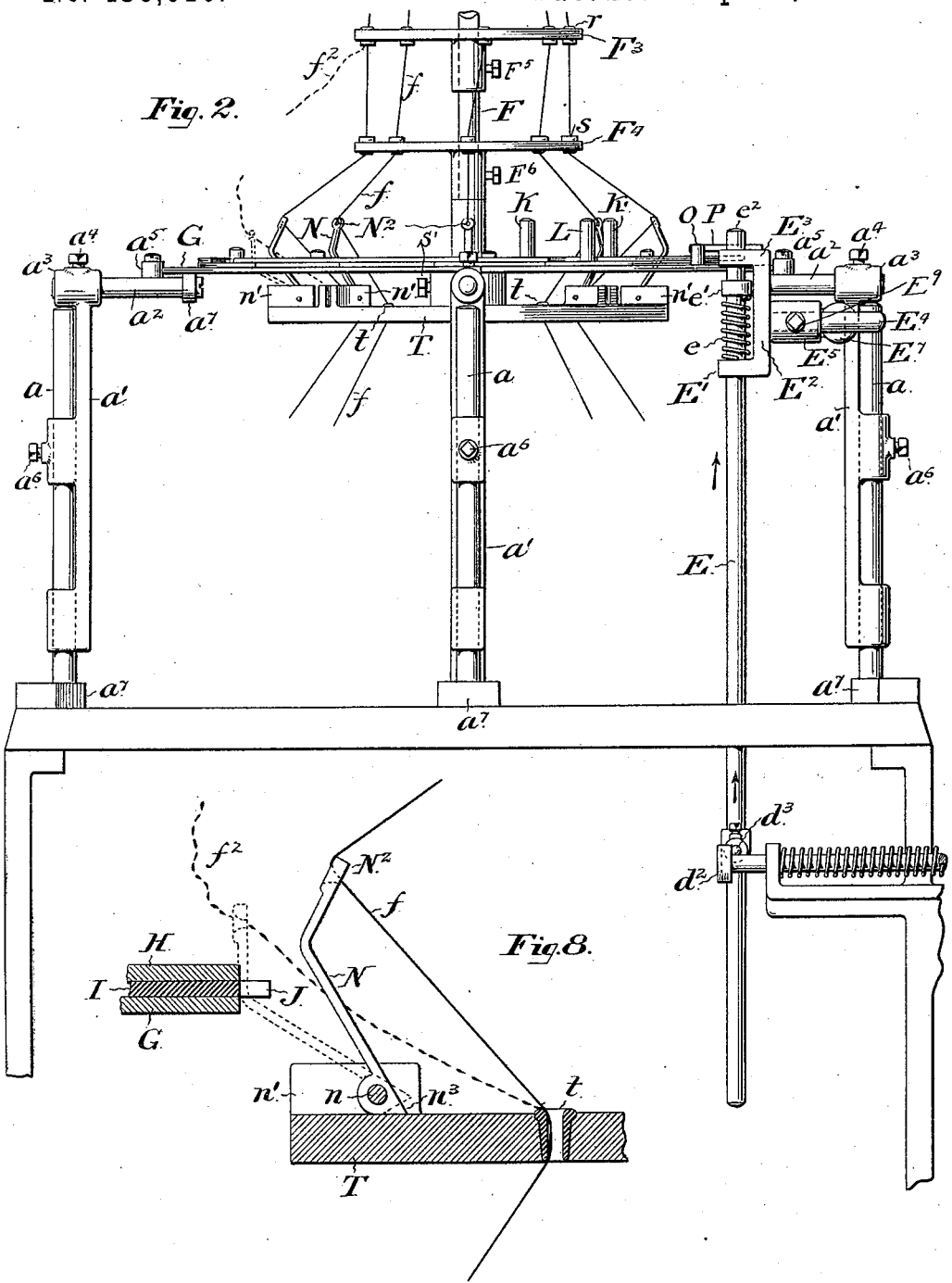

(No Model.) 5 Sheets—Sheet 3.
H. S. TOWNSEND & G. A. SCHNEEBELI.
STOPPING MECHANISM FOR KNITTING MACHINES.
No. 436,010. Patented Sept. 9, 1890.

Witnesses:

Inventor

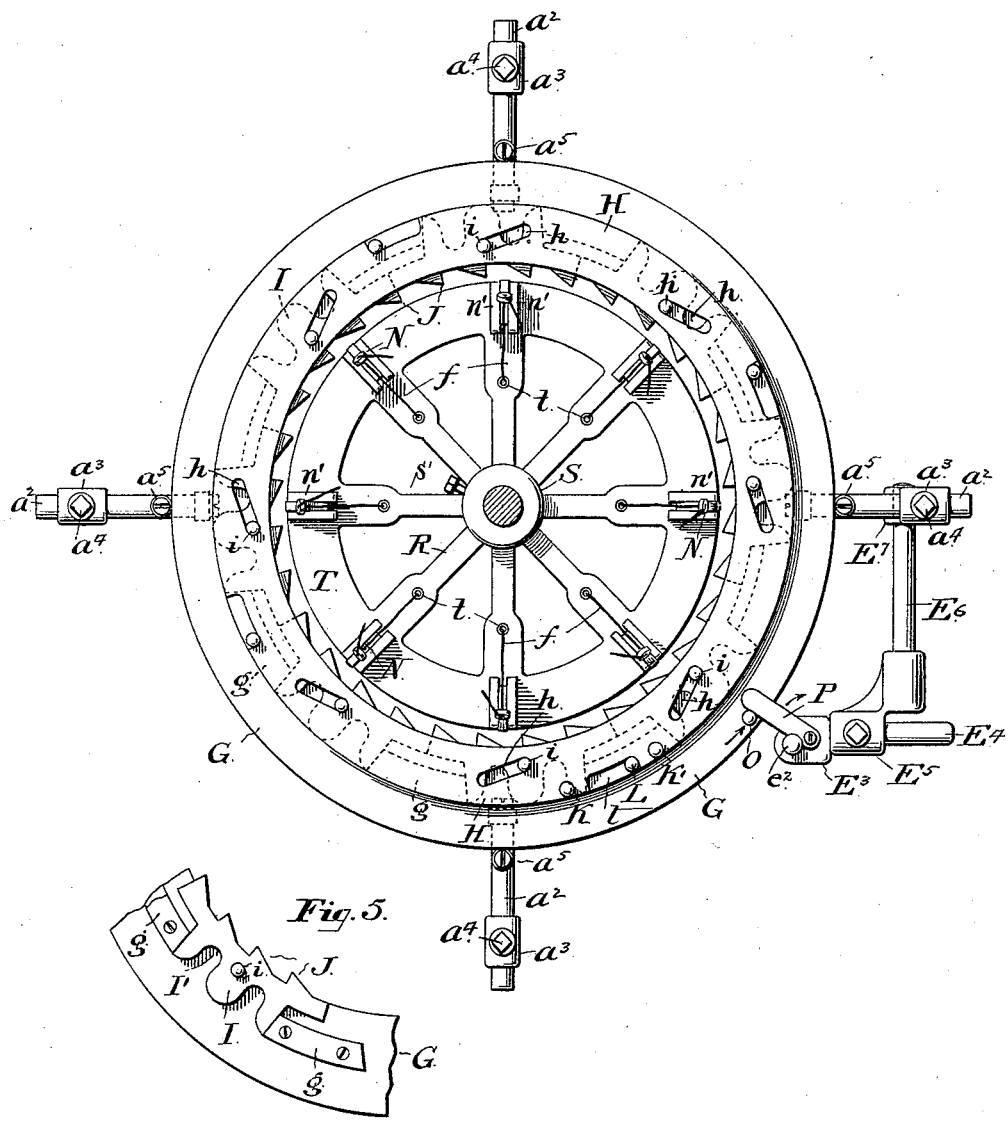

(No Model.) 5 Sheets—Sheet 5.

H. S. TOWNSEND & G. A. SCHNEEBELI.
STOPPING MECHANISM FOR KNITTING MACHINES.

No. 436,010. Patented Sept. 9, 1890.

WITNESSES: INVENTOR

UNITED STATES PATENT OFFICE.

HARRY S. TOWNSEND AND GUSTAV ADOLPH SCHNEEBELI, OF NAZARETH, PENNSYLVANIA.

STOPPING MECHANISM FOR KNITTING-MACHINES.

SPECIFICATION forming part of Letters Patent No. 436,010, dated September 9, 1890.

Application filed April 4, 1890. Serial No. 346,537. (No model.)

*To all whom it may concern:*

Be it known that we, HARRY S. TOWNSEND and GUSTAV ADOLPH SCHNEEBELI, both of Nazareth, county of Northampton, State of Pennsylvania, have invented certain new and useful Improvements in Stopping Mechanism for Circular-Knitting Machines.

The following is a specification of our said improvements, reference being had to the accompanying drawings, wherein—

Figure 1:
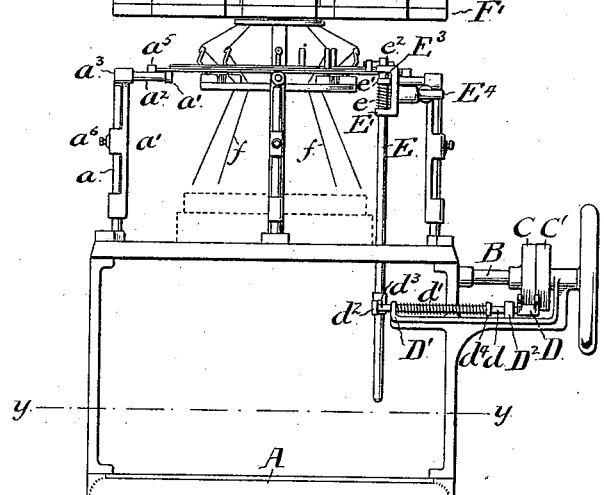
Figure 6:
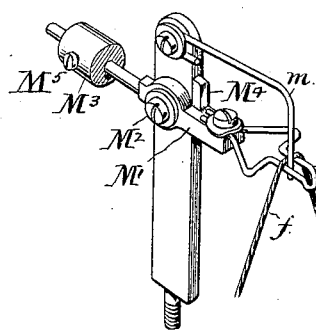
Figure 7:
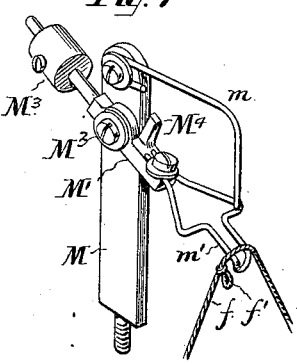
Figure 3:
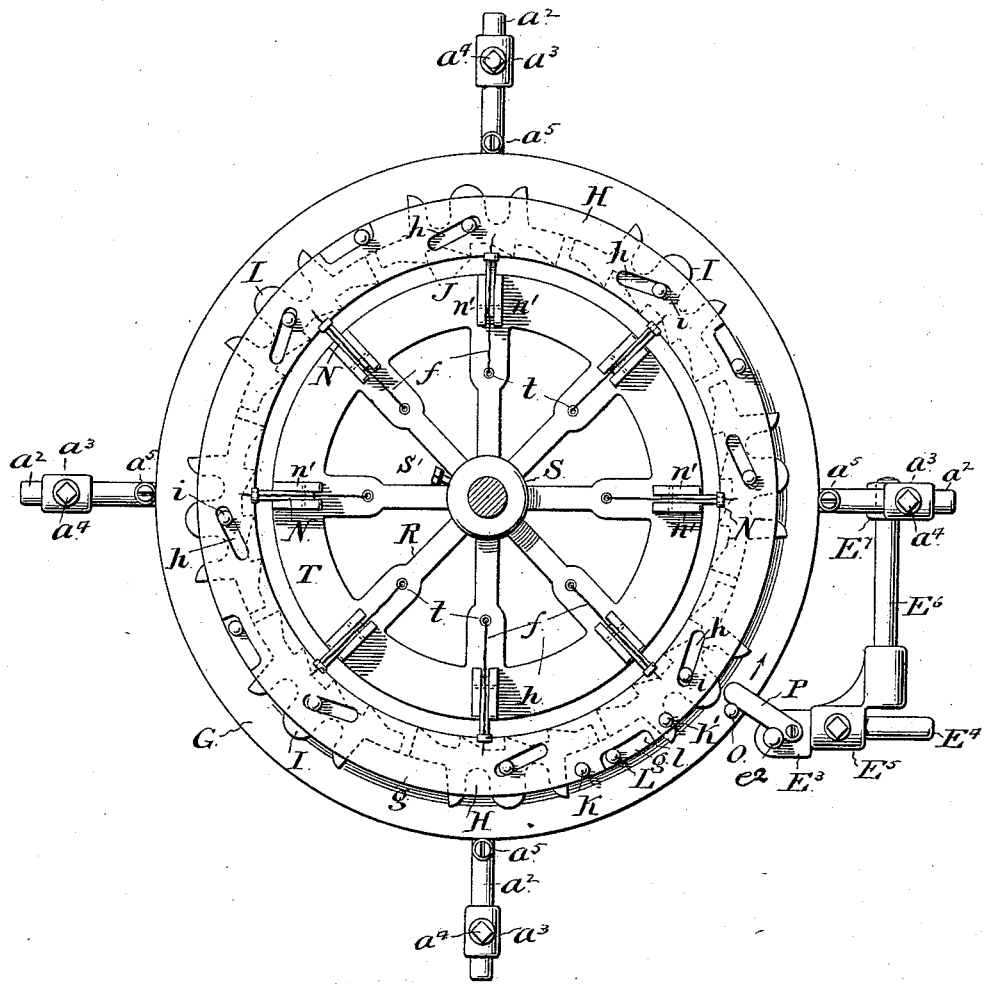
Figure 9:
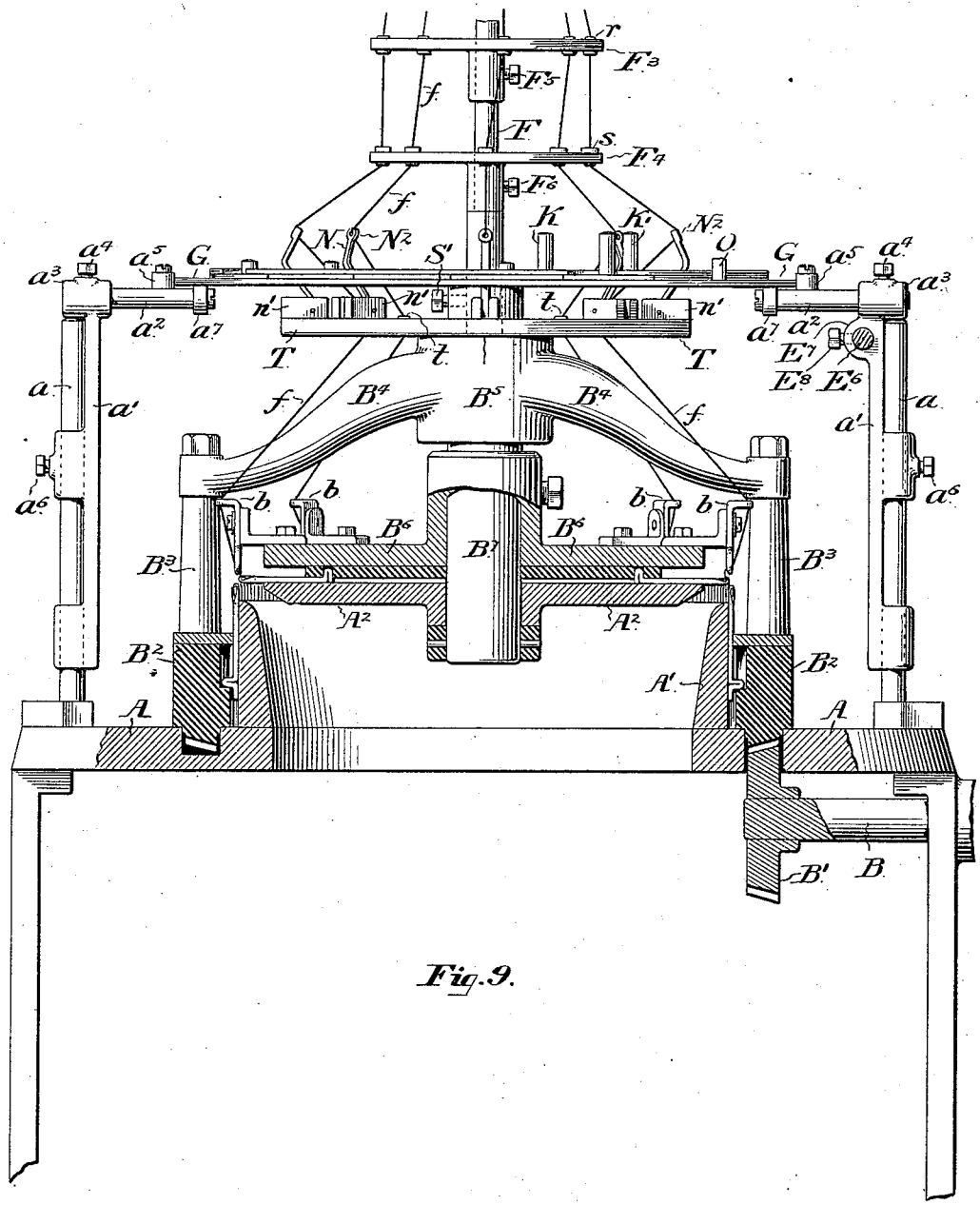

Figure 1 is a general view, in elevation, of our invention as applied to an ordinary eight-feed knitting-machine, the knitting mechanism proper, however, not being shown in full detail, as its construction is well understood and as its details have no immediate relation to the stop-motion devices. Fig. 2 is a partial view, in elevation and on an enlarged scale, of certain portions of the device—that is to say, so much as is included between the horizontal lines $x$ $x$ and $y$ $y$ of Fig. 1. Fig. 3 is a top or plan view of those portions which are shown in Fig. 2, with the stop-motion devices in a position proper for the start of the knitting operation. Fig. 4 is a top or plan view of the same parts in position ready for action after the knitting operation is under way. Fig. 5 is a detail view of one of the segments which are shown in dotted lines in Figs. 3 and 4, certain adjacent portions being also indicated. Fig. 6 is a view in perspective and on an enlarged scale of one of the latch-levers upon whose action certain features of operation depend, showing said device in its normal position of rest; and Fig. 7 is a view of the same parts in the position which they assume when called into action. Fig. 8 is a view, also on an enlarged scale, illustrating one of the tumblers which are the immediate agents for acting upon the stop-motion device, showing said tumbler in its normal position of rest, and also, in dotted lines, in its active position of engagement with the stop-motion mechanism. Fig. 9 is a view, partly in elevation and partly in vertical section, of the needle-cylinder, cam-cylinder, and dial-plate, showing the method of supporting the rotating standard which carries the tumblers and levers.

The object of our invention is to provide a simple and efficient means for instantly stopping the action of the knitting-machine when the yarn breaks or in the event of any tangle or knot occurring in the yarn which might produce defective work.

Minor features of the invention relate to the capacity of the parts for adjustment to fit different machines, &c.

Referring to the drawings, A represents the table or stand of the machine, A', Fig. 9, the needle-cylinder, A² the dial-plate, B² the rotating cam-cylinder, B⁶ the rotating cam-plate of the dial-plate, and $b$ the thread-eyes mounted thereon. B is the driving-shaft, provided at its inner end with a bevel-gear B', Fig. 9, adapted to engage with the correspondingly-beveled gearing on the under periphery of the cam-cylinder B² and having fast and loose pulleys C C', respectively, the belt upon said pulleys being controlled by an ordinary belt-shifter D, whose rod $d$ slides horizontally in suitable guides D' D². A spring $d'$, abutting at one end against the guide D' and at the other against a collar $d^4$ upon the rod $d$, tends to throw the belt from the fast pulley C to the loose pulley C'. This movement, however, is normally prevented by means of a detent-stud $d^3$, which engages with the head $d^2$ of the rod $d$, said detent being adjustably secured to a rod E, which extends up through the table-top and is arranged to move vertically in suitable guide-openings formed in the guide-pieces E' E³. These guide-pieces are connected by means of the piece E², which is mounted on the end of a rod E⁴, sliding lengthwise in the horizontal socket-piece E⁵ and secured in any given position by means of a set-screw E⁹. The socket-piece E⁵ is also mounted upon one end of a rod E⁶, sliding lengthwise horizontally (at right angles to the direction of movement of the rod E⁴) in a socket-piece E⁷, attached to the side of one of the telescoping standards $a$ $a'$, said rod E⁶ being secured in any desired position by means of a set-screw E⁸. Near the upper end of said rod E is a collar $e'$, and intermediate between said collar and one of the guides E' for said rod is a spring $e$, tending to throw said rod vertically upward and consequently to disengage the detent $d^3$ from the head $d^2$ upon the rod $d$, and thus permit the belt-shifter to act. The rod E is normally secured against such vertical movement by means of a finger P, pivoted to the top of the guide-piece $E^3$ and engaging with a lateral notch formed in the projecting upper end $e^2$ of the rod E.

Upon the top of the table A are mounted four or more vertical standards $a$, upon which are telescoping extensions $a'$, secured to said rods by set-screws $a^6$. At the top of said extensions are transverse sockets $a^3$, from which horizontal rods $a^2$ project radially inward, said rods being radially adjustable and secured by means of set-screws $a^4$. The rods $a^2$ terminate at their inner ends in anti-friction rollers $a^7$, and are provided at a short distance from said inner ends with vertical studs $a^5$, in order to maintain in position and guide the compound ring which forms one of the principal features of our machine, and which will now be described. (See Figs. 3, 4, and 5.)

A flat base-ring G, of sufficient width to afford a suitable bearing for the other members of the compound ring, is supported upon friction-rolls $a^7$ on the inner ends of the four rods $a^2$, being secured against lateral displacement (though free to rotate) by means of the studs $a^5$. Freely resting upon this ring G is a series of flat segments I, (in the instance shown eight in number,) whose inner edges are serrated in the form of teeth J, and whose outer periphery may for the sake of lightness be indented, as shown by the waved line I' in Fig. 5, the only requirement being that the segment shall have enough depth to afford a proper bearing-surface. Each of said segments I is provided with a short vertical stud $i$ on its upper side. Intermediate between each pair of segments the base-ring G is provided with flat bearing-pieces $g$, of a height or thickness barely exceeding that of the segments I, and resting freely upon these bearing-pieces $g$ is a flat top ring H, having inclined cam-slots $h$, corresponding in number and position with the studs $i$, which enter them. The parts thus have the following relations and capacities: The entire compound ring is capable of a rotary movement in a horizontal plane. The top ring H is capable of independent rotary movement in a horizontal plane, and the segments I are capable of simultaneous radial movement in a horizontal plane, which radial movement is effected in one direction or the other by the action of the cam-slots $h$ upon the studs $i$ as the top ring H is independently rotated. The length of each segment is preferably such that in their innermost position they are in contact, and they are of course separated slightly when shifted outward. The depth of the teeth J is such that when the segments are in their outer position said teeth are concealed in the space between the top ring H and the base-ring G, and only protrude when the segments are shifted inward. The independent rotary movement of the top ring H to shift the segments radially is effected by hand, and convenient adjuncts for aiding the operator are found in the studs K K', rigidly mounted on the top of the ring H, with an intermediate stud L rigidly mounted on one of the bearing-pieces $g$ and projecting up through an elongated notch in the periphery of the ring H.

At a point near the outer periphery of the ring G and adjacent to the point where the vertical rod E of the belt-shifting mechanism protrudes above its top guide $E^3$ is an upwardly-projecting stud O, adapted to engage with the pivoted finger P. This engagement of the finger P with the notched head $e^2$ constitutes, as before stated, the means whereby said rod is normally prevented from springing upward to disengage the belt-shifting rod, and it is obvious that rotation of the ring G in the direction of the arrows, Figs. 3 and 4, would turn said finger out of engagement with the notch, and thus permit the rod E to spring upward. The stop-motion device about to be described operates automatically to produce such rotation of the ring G, and thus stop the machine.

As shown in Fig. 9, upon the top of the rotating cam-cylinder $B^2$ are mounted posts $B^3$, preferably two in number, from the tops of which arms $B^4$ project radially inward and terminate in a central hub $B^5$. A vertical shaft $B^7$ depends from said hub and carries the rotating cam-plate $B^6$ for the dial-needles and also supports the dial $A^2$, and said hub also carries a vertical standard F. Near the top of said standard is a disk $F^2$, in which is supported (in number corresponding to the feeds of the machine) a series of vertical posts M. (See Fig. 6.) Each of said posts has a horizontal lever M', pivoted at $M^2$ to its side, said lever having at its rear end an adjustable weight $M^3$, secured in place by a set-screw $M^5$, and at its inner or front end a wire loop $m'$, preferably of the form shown, which we term the "latch." A stop $M^4$ limits the motion of the latch-lever M' in one direction and supports it normally in a horizontal position, as shown in Fig. 6. An overhanging wire finger $m$ is secured at the top of the post M, and the downwardly-depending end of said wire enters the narrow opening in the front portion of the latch $m'$, as shown in Fig. 6. When the latch-lever is depressed, as shown in Fig. 7, so as to throw the latch $m'$ downward, the end of the finger $m$ clears the opening in the latch, as indicated in said figure. The standard F also carries at a vertical height slightly below the compound ring a wheel-shaped frame consisting of a hub S, vertically adjustable upon said standard by means of a set-screw S', a series of radial spokes R, and a flat outer rim T, of slightly-smaller diameter than the ring H. A series of tumbler-pieces N, corresponding in number to the feeds of the machine, and preferably of the bent form shown clearly in Fig.

8, is pivoted at $n$ between pairs of vertical supports $n'$, mounted upon the upper surface of the rim T. The outer or free ends of said tumblers are provided with eyes $N^2$ for the yarn, and their lower ends are each formed with a stop projection $n^3$ to limit their rising or inward movement, as shown in the solid lines of Fig. 8. The falling or outward movement of the tumblers into the position indicated by the dotted lines in Fig. 8 brings their bent outer ends into contact with the inner edge of the compound ring, and therefore into engagement with the teeth J when the latter protrude.

The yarn-bobbins Y are supported on a horizontal frame $F'$, mounted upon the standard F, and a pair of rotatable disks $F^3$ $F^4$, provided, respectively, with eyes $r$ $s$, are also mounted upon said standard F at a point on opposite sides of the bobbin-supporting frame $F'$. Each yarn $f$ rises from the bobbins Y, passes over the latch $m'$ on the inner side of the finger $m$, (see Figs. 1 and 6,) and thence descends through an eye $r$ in the disk $F^3$, a second eye $s$ on the disk $F^4$, thence through an eye $N^2$ of a tumbler N, thence through an eye $t$ in a spoke R, and thence passes to the ordinary thread-eye of the knitting mechanism.

The disks $F^3$ and $F^4$ are adjustably mounted upon the standard F by means of set-screws $F^5$ $F^6$, respectively, and can be turned or shifted relatively to one another, so that the yarn shall pass at a considerable angle from the eye $r$ of one to the eye $s$ of the other, and thus produce any desired degree of tension, the strain of course increasing with the amount of angle thus produced in the direction of the yarn. The amount of said tension is sufficient when the machine gets under way to sustain the tumblers N in their raised or innermost position.

The weight $M^3$ upon the latch-levers at the top of the machine is so adjusted that the normal pull of the yarn in passing over said latches shall not be sufficient to depress them; but when a lump or tangle occurs, as indicated in Fig. 7 at $f'$, the increased friction of the yarn in passing over the latch $m'$ will pull the latch-lever downward, so as to clear the finger $m$, and the yarn will then slip off the end of the latch and drop down. The effect of this (as well as the effect of a breakage in the yarn) will be described in connection with the description of the machine's operation, which is as follows:

When the machine is to be started, the operator places his thumb upon the stud K and finger upon the stud L, and by a compressing or pinching movement shifts the stud K toward the stud L, so as to turn the ring H to the left, or in a direction opposite to that of the hands of a watch. This movement of the ring H causes the cam-slots $h$ to act upon the studs $i$ of the segments and throw said segments outward, so as to retract the teeth J within the periphery of the ring H. The knitting operation is then started. For the first moments of the operation the tension upon the yarn is not definitely established, and thus the tumblers N, or some of them, may be in their outward position, so that were it not for the retraction of the teeth J out of their range one of them might engage with a tooth and thus stop the machine. As soon as the knitting operation is under way and the normal tension upon the yarn is established said tumblers N will all be in their raised or inward position, as indicated in Fig. 1 and in the solid lines of Figs. 2 and 8. The operator then puts his thumb upon the stud L and his finger upon the stud $K'$, and by pinching them together shifts the ring H to the right, or in a direction similar to that of the hands of a watch. This movement of the ring H causes the cam-slot $h$ to act upon the studs $i$ so as to throw the segments I inward and protrude the teeth J into a position ready for engagement. If, now, a thread breaks, or if by reason of the occurrence of a tangle or knot in the yarn the latches $m'$ let the yarn fall, the tension upon that particular yarn will of course cease and the yarn will hang loose, as indicated (in the case of breakage) by the dotted lines in Figs. 2 and 8. The tumbler N of said yarn will thereupon drop outward, as shown in the dotted lines of Figs. 2 and 8, and will come into engagement with the nearest tooth J. Since the frame which supports said tumblers is rotating with the standard F, the engagement of the tumbler N with the tooth J will shift the compound ring bodily in the direction of rotation, and such rotation of the ring will cause the stud O to throw the finger P out of engagement with the notch in the rod E. Said rod will then spring upward and disengage the detent $d^3$, whereupon the belt-shifting rod $d$ will become operative and move the belt-shifter D, so as to throw the belt from the fast pulley C to the loose pulley $C'$ and stop the machine.

In the type of apparatus selected for illustrating our invention, as above, gravity alone is relied on for sustaining the latch-levers against the normal pull of the thread, and for causing the engagement of the tumblers with the teeth of the compound ring; but either or both of these elements might be spring-actuated, and we therefore do not intend to limit our claim to the particular form of these devices shown. Furthermore, while we deem the compound ring the best form of mechanism for communicating the action of the tumblers to the belt-shifter, we do not confine ourselves to the precise structure shown, it being only necessary that there should be a control over the belt-shifter proper through the agency of mechanism capable of engagement with a tumbler when the latter leaves its normal position and capable of movement (when thus engaged) in a direction proper for permitting the belt-shifting action or directly causing such action by the intervention of proper mechanism. Hence in our broader claims we designate the group of devices intermediate between the belt-shifter proper and the tumbler as "shifting mechanism."

Having thus described our invention, we claim—

1. In a knitting-machine, the combination of a belt-shifter, shifting mechanism connected therewith, a movable tumbler mounted upon a rotating member of the machine and normally tending to engage with said shifting mechanism, a latch-lever, and yarn-guides arranged with relation to said latch-lever and tumbler, substantially as set forth, whereby the yarn when normally sustained by said latch-lever restrains the tumbler from engagement with the shifting mechanism, but permits said engagement when the latch-lever releases said yarn, substantially as set forth.

2. In a knitting-machine, the combination of a belt-shifter, a rotatable ring mechanism, substantially as set forth, whereby said ring is operatively connected with said belt-shifter, a series of teeth upon said ring, a standard supported from the cam-cylinder and rotating therewith, a series of tumblers supported by said standard and normally tending to engage with said teeth, and a series of yarn-guides arranged with relation to said tumblers, substantially in the manner set forth, whereby the yarns in their normal travel to the knitting mechanism restrain the tumblers from engagement with the teeth of the ring, but permit such engagement in case of breakage or release of tension, substantially as set forth.

3. In a knitting-machine, the combination of a belt-shifter, a rotatable base-ring, mechanism, substantially as set forth, whereby said base-ring is operatively connected with said belt-shifter to cause or permit the belt-shifting operation thereof, movable toothed segments mounted upon said ring, means, substantially as set forth, whereby said segments can be moved inward and outward upon said ring, so as to cause either the withdrawal or the protrusion of the teeth, a tumbler mounted upon a rotating portion of the machine in proximity to said toothed segments and normally tending to engage with the teeth thereof, and yarn-guides arranged with relation to said tumbler, substantially in the manner set forth, whereby the yarn in its normal passage to the knitting mechanism restrains the tumbler from engagement with said teeth, but permits said engagement in case of breakage or release of tension, substantially as set forth.

4. In a knitting-machine, the combination of a belt-shifter, a base-ring, mechanism, substantially as set forth, whereby said base-ring is operatively connected with said belt-shifter to cause or permit the belt-shifting operation thereof, toothed segments freely mounted to move inward and outward upon said base-ring, a top ring mounted above said movable segments and capable of rotation with relation thereto, said segments and top ring being provided with pins and cam-slots to produce the inward and outward throw of the segments by the rotation of said top ring, tumblers mounted upon a rotating frame within said rings and tending to normally fall outward into engagement with the teeth of the segments, and yarn-guides arranged in relation to said tumblers, substantially in the manner set forth, whereby the yarn in its normal passage to the knitting mechanism restrains the tumblers from engagement with said teeth, but permits said engagement in case of breakage or release of tension, substantially as set forth.

5. In a knitting-machine, the combination, with the table, of a group of vertically-adjustable posts, a series of adjustable horizontal arms supported by said posts, friction-rollers on the inner ends of said arms, a rotatable compound ring mounted upon said friction-rollers, a belt-shifter connected with a member of said ring, substantially as set forth, whereby the rotation of said ring causes or permits the belt-shifting movement, a series of tumblers mounted on a rotating portion of the machine within said ring, said tumblers normally tending to engage with projections upon said ring, and yarn-guides arranged in relation to said tumblers, substantially in the manner set forth, whereby the yarn in its normal passage to the knitting mechanism restrains the tumblers from engagement with said teeth, but permits said engagement in case of breakage or release of tension, substantially as set forth.

HARRY S. TOWNSEND.
GUSTAV ADOLPH SCHNEEBELI.

Witnesses:
ED. HELLICK,
L. A. SCHNEEBELI.